June 17, 1930.    T. HASHIMOTO    1,765,072

STEAM PRESSURE COOKER

Filed Sept. 19, 1928

INVENTOR
*Takichi Hashimoto*
BY
ATTORNEYS

Patented June 17, 1930

1,765,072

UNITED STATES PATENT OFFICE

TAKICHI HASHIMOTO, OF KAMAKURA-GUN KANAGAWA, JAPAN

STEAM-PRESSURE COOKER

Application filed September 19, 1928. Serial No. 306,996.

This invention relates to the improvements in steam-pressure cookers and has for its objects a cooker lighter in weight and handier in use than those hitherto known. The construction of my invention consists mainly of the following parts namely; the body of cooker made of aluminium or other metals, two handles, (hereinafter called body-handle) each placed opposite to the other and having its arms on two sides loosely fitted to two pieces of plates each of which has a wing or ear, and is riveted to the body of the cooker at its upper part and on its outside, the said two wings having grooves into any of which the arms of each handle which has curvatures, are made to fit by their resilient action produced when the ridges of curvatures are forced upon, and slid on over those of the grooves, so that the handles by the above operation can be held at any desired position or angle.

Figure 1:
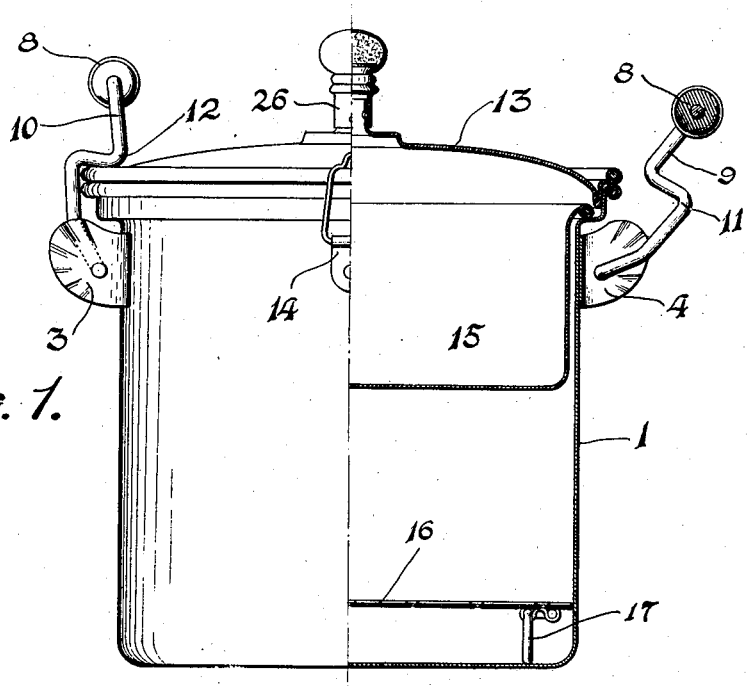
Figure 2:
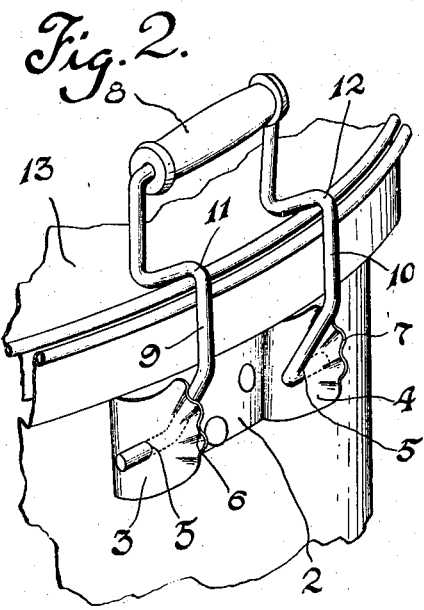

The annexed drawings illustrate an example of one form, among many, of the application of my invention. Fig. 1 is the front view of the cooker showing its right half in a vertical section. Fig. 2 shows a body-handle in an oblique position.

To describe in detail the construction of the cooker, the body of the cooker 1 has a pair of plates 2 fixed, each opposed to the other, to the surface of the said body directly below its rim or edge. The wings 3 and 4 extending outward of the plates each having a hole 5 therethrough are pressed and bent in undulating lines so that several concave parts 6 and 7 are produced. To the holes are fitted loosely the arms 9 and 10 of body-handles 8 the ends of which are partly so bent that the said parts 11 and 12 act to tightly press upon the lid 13 and further that they can be forced, by their resilient action, up and down upon the face of the wings upon which a pressure is borne and at the same time can retain their position at a required angle whenever they are left to remain in any one of the said concave parts or grooves of the wings 6. The lid 13 is tightly pressed on the body of the cooker by the bent parts 11 and 12 of the body-handle engaging in the depressed portion of the lid adjacent its rim and also by hook or hooks 14 which are loosely fitted into a plate fixed on the upper two parts outside the cooker thus serving as an auxiliary means to withstand the steam-pressure.

Having thus described my invention, what I claim is:—

1. In a cooker construction of the character described, a cooker body, a lid therefor, a plurality of plates secured to the outer side of said body, each plate having a pair of spaced ears extending outwardly therefrom, each ear being provided with an opening and having grooves extending radially from said opening upon the inner side of the ears, and a handle comprising a U-shaped member made of resilient material and having its legs journaled in the openings of the ears, and said legs disposed on the inside of the ears so that they engage the radial grooves and permit the handle to be sustained in different positions.

2. In a cooker construction of the character described, a cooker body, a lid therefor, a plurality of plates secured to the outer side of the body, each plate having a pair of spaced ears extending outwardly therefrom, each ear provided with an opening and having grooves extending radially from said opening upon the inner faces of the ears, and a handle comprising a U-shaped member, made of resilient material and having its legs journalled in the openings of the ears, said legs bent abruptly between their ends to provide a clamping shoulder to engage the lid to clamp the same in position on the body, when the handle is swung to upright position, said legs disposed on the inside of the ears whereby to engage the radial grooves and permit the handle to be held in different angular positions.

3. In a cooker construction of the character described, a cooker body, a dome-shaped lid therefor having a depressed portion adjacent its periphery, the rim of said lid beyond the depression adapted to fit on the edge of the body, a plurality of pairs of spaced apart ears projecting outwardly from the body, each ear having an opening, a handle comprising a U-shaped member made of resilient material and having its legs pivoted in the openings of the ears, said legs being abruptly bent between their ends to form clamping shoulders adapted to frictionally engage the lid within its depressed portion, when swung to upright position, whereby to clamp the lid in position on the body.

In testimony whereof I have affixed my signature.

TAKICHI HASHIMOTO.